United States Patent [19]

Beijer et al.

[11] 4,141,520
[45] Feb. 27, 1979

[54] FAIL-SAFE LOCK FOR AN AIRPLANE RUDDER

[75] Inventors: Gene Beijer, North Hollywood; James S. Smith; Ralph L. Sheffer, both of Arcadia, all of Calif.

[73] Assignee: Adams Rite Products, Inc., Glendale, Calif.

[21] Appl. No.: 808,027

[22] Filed: Jun. 20, 1977

[51] Int. Cl.² .............................................. B64D 47/00
[52] U.S. Cl. .................................. 244/83 A; 292/173; 292/DIG. 49
[58] Field of Search ......................... 244/83 A, 87, 1 R; 114/162; 292/173, 201, DIG. 49, DIG. 69

[56] References Cited

U.S. PATENT DOCUMENTS

| | | | |
|---|---|---|---|
| 1,671,249 | 5/1928 | Lieberman | 292/DIG. 49 |
| 2,203,396 | 6/1940 | Sterhardt | 244/87 X |
| 2,584,038 | 1/1952 | Morrison | 244/83 A |

FOREIGN PATENT DOCUMENTS 944766 12/1963 United Kingdom ...................... 292/173

*Primary Examiner*—Barry L. Kelmachter

[57] ABSTRACT

A locking mechanism for a swingably mounted flight control surface member of an airplane, such as a rudder, which is embodied in a unitized frame structure that can be applied to either new or existing airplanes, which includes a bracket mounted assembly arranged for mounting within an enclosed portion such as the tail cone, in a position wherein a reciprocable locking bolt may be manually selectively moved by an outside ground attendant to a projecting position in locking engagement with a keeper carried by an adjacent part of the flight control member, and to a released retracted position. The bolt is connected to one end of a rocker arm carried by a rotatable shaft having an end extending to the exterior of the enclosed portion, and being arranged for releasably receiving an actuating tool. A spring urges the rocker arm, upon movement through a dead-center position, into limit positions corresponding to the locking and unlocking positions of the bolt, and a switch is arranged for actuation at one of the operative positions of the bolt. A fail-safe feature includes an associated cam for moving the bolt from a locking position to an unlocking position in response to the movement of a control member for another flight control surface member, for example, an elevator, by control actuated from the airplane cockpit.

16 Claims, 5 Drawing Figures

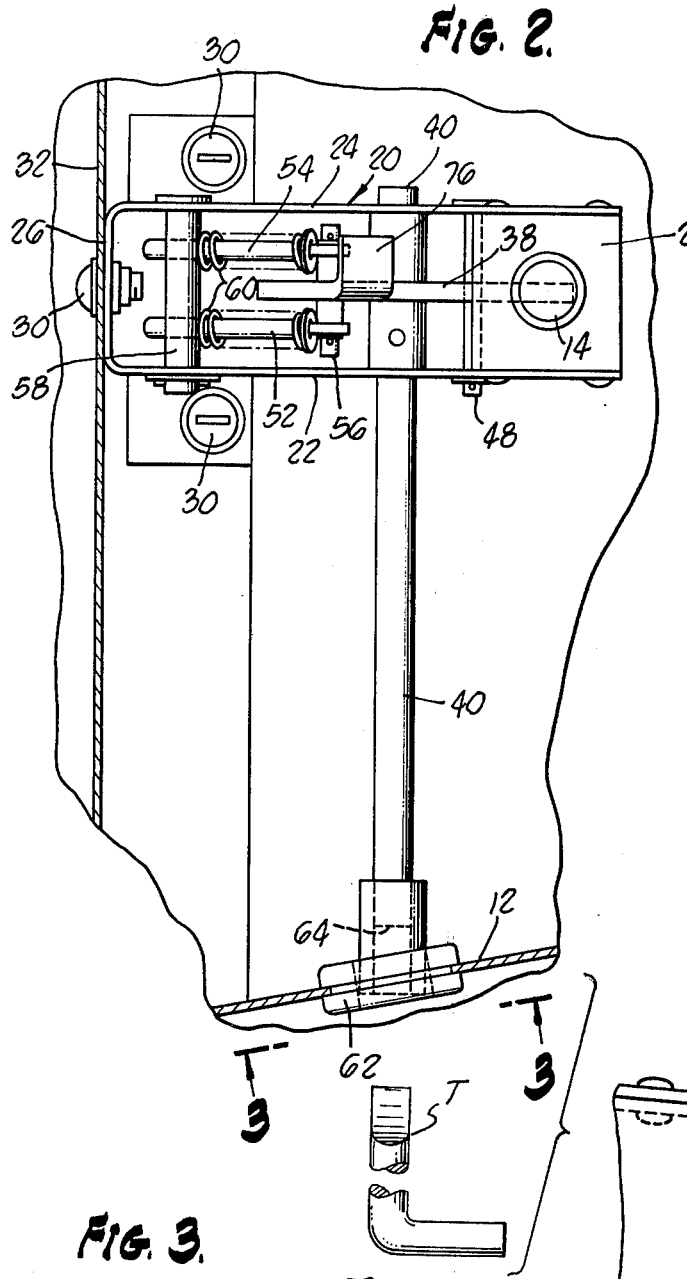
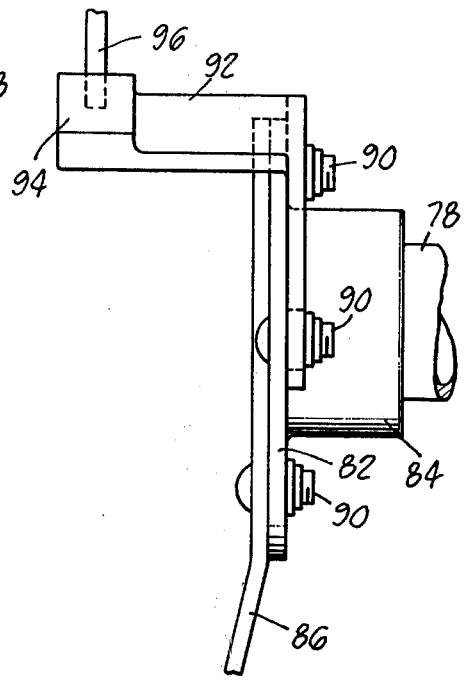
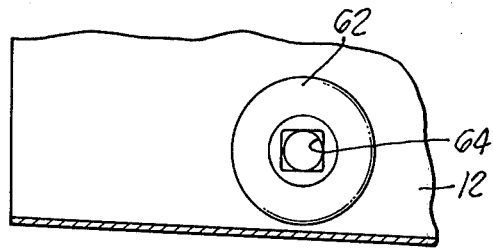
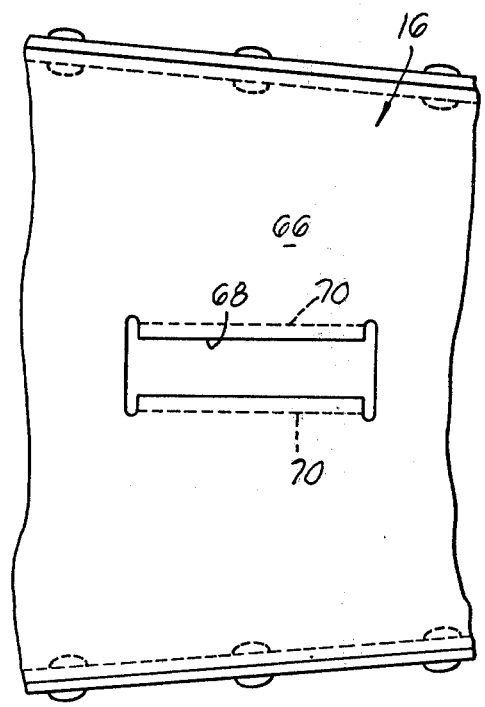
FIG. 2.
FIG. 3.
FIG. 4.
FIG. 5.

FAIL-SAFE LOCK FOR AN AIRPLANE RUDDER

PRIOR ART

In the prior art there are disclosed a number of locking arrangements for flight control surface members of airplanes, these arrangements being primarily concerned with mechanisms which can be controlled and actuated from the cockpit of the airplane. The closest art known to applicants are the following U.S. Pat. Nos.:

2,144,135 - Jan. 17, 1939
2,203,396 - June 4, 1940
2,294,906 - Sept. 8, 1942
2,406,233 - Aug. 20, 1946
2,561,558 - July 24, 1951
2,570,586 - Oct. 9, 1951
2,584,038 - Jan. 29, 1952
2,835,459 - May 20, 1958
3,288,401 - Nov. 29, 1966

BACKGROUND OF THE INVENTION

The present invention relates generally to the field of airplanes, and is particularly concerned with improvements in locking means for movable flight control surface members, such as rudders and the like, when parked.

Serious problems are encountered by airplanes, and particularly light airplanes, which are parked outside of hangers at airports, due to the effects of high winds as well as jet and propeller streams from neighboring aircraft. These wind effects are particularly disastrous in the case of the large surface flight control elements such as the rudder, and can not only result in damage to the parts themselves, but may readily have damaging effects on the control mechanisms, such as cables and the like.

Heretofore, it has been the practice in light planes particularly to utilize retaining straps or other expedients for clampingly retaining the control elements against movement. This is not only inconvenient but creates a hazard, in the event that these clamping elements are not removed prior to take-off.

This problem has been appreciated in the industry, and many arrangements have been suggested for locking and releasing the locked flight control elements by means of controls located in the cockpit, as exemplified by the above-noted prior art patents. In the main, the prior arrangements have been quite complicated arrangements and embody the use of components which must be built into the airplane at the time of its construction. Moreover, the arrangements did not as a rule include locking mechanisms which could be manually locked and unlocked by a ground attendant.

The locking mechanism as disclosed in U.S. Pat. No. 2,203,396 attempts to solve many of the inherent problems which are presented, but here, again, leaves much to be desired. While this patent does disclose a mechanism which can be operated by a ground attendant into locked and unlocked positions, and which is further arranged to be released by controls in the cockpit, the locking mechanism is such that it must of necessity be built into the airplane, and is not adapted to be installed as a unitized structure in airplanes which have already been built, and in which the locking mechanism is applied directly to the control element rather than indirectly as through a rudder controlling yoke as shown in U.S. Pat. No. 2,203,396.

The unitized locking mechanism of the present invention is such that it can be installed in existing planes and connected with existing cockpit controls to provide a fail-safe operation which will assure that the locking mechanism will be released prior to take-off, in the event that it has inadvertently been left in a locking position. Thus, the present invention enables an existing plane to be fitted with a locking mechanism particularly for the rudder element at a reasonable cost and with a minimum modification or change to the airplane existing structure. Moreover, the present invention discloses a structure which is contained within a closed portion of the plane so that it has no interference with the aerodynamics or surface structure of the plane.

SUMMARY OF THE INVENTION

Having in mind the inadaptability of the locking mechanisms of the prior art, the present invention is concerned particularly with improvements in the prior art structures, and which may be applied to existing airplanes to provide a locking mechanism for flight control elements, and in particular for the rudder, when the airplane is parked on the ground.

It is one object of the herein described invention to provide an improved locking mechanism for a flight control element, such as a rudder, which is of simplified construction, which can be economically fabricated to provide a unified assembly, and which can be applied to existing airplanes.

A further object resides in the provision of a unique locking mechanism for an airplane rudder, which is manually operable by a ground attendant by means of an appropriate tool.

Another object resides in the provision of unique fail-safe means for releasing the locking bolt and moving it to a non-locking position, in response to the operation of another flight control element of the airplane, such as an elevator.

Further objects and advantages of the invention will be brought out in the following part of the specification, wherein detailed description is for the purpose of fully disclosing a preferred embodiment of the invention without placing limitations thereon.

BRIEF DESCRIPTION OF THE DRAWINGS

Referring to the accompanying drawings, which are for illustrative purposes only:

FIG. 2 is a fragmentary horizontal view, showing details of the locking mechanism and external manually operable means;

FIG. 3 is a fragmentary sectional view, taken substantially on line 3—3 of FIG. 2, showing the tool-receiving end of the manual operating element;

FIG. 4 is a fragmentary plan view of the keeper element mounted on the adjacent portion of the airplane rudder, as viewed substantially along line 4—4 of FIG. 1; and FIG. 5 is a fragmentary elevational view of associated parts of the fail-safe mechanism connection with the elevator cockpit control, as viewed substantially along line 5—5 of FIG. 1.

DESCRIPTION OF A PREFERRED EMBODIMENT

Figure 1:
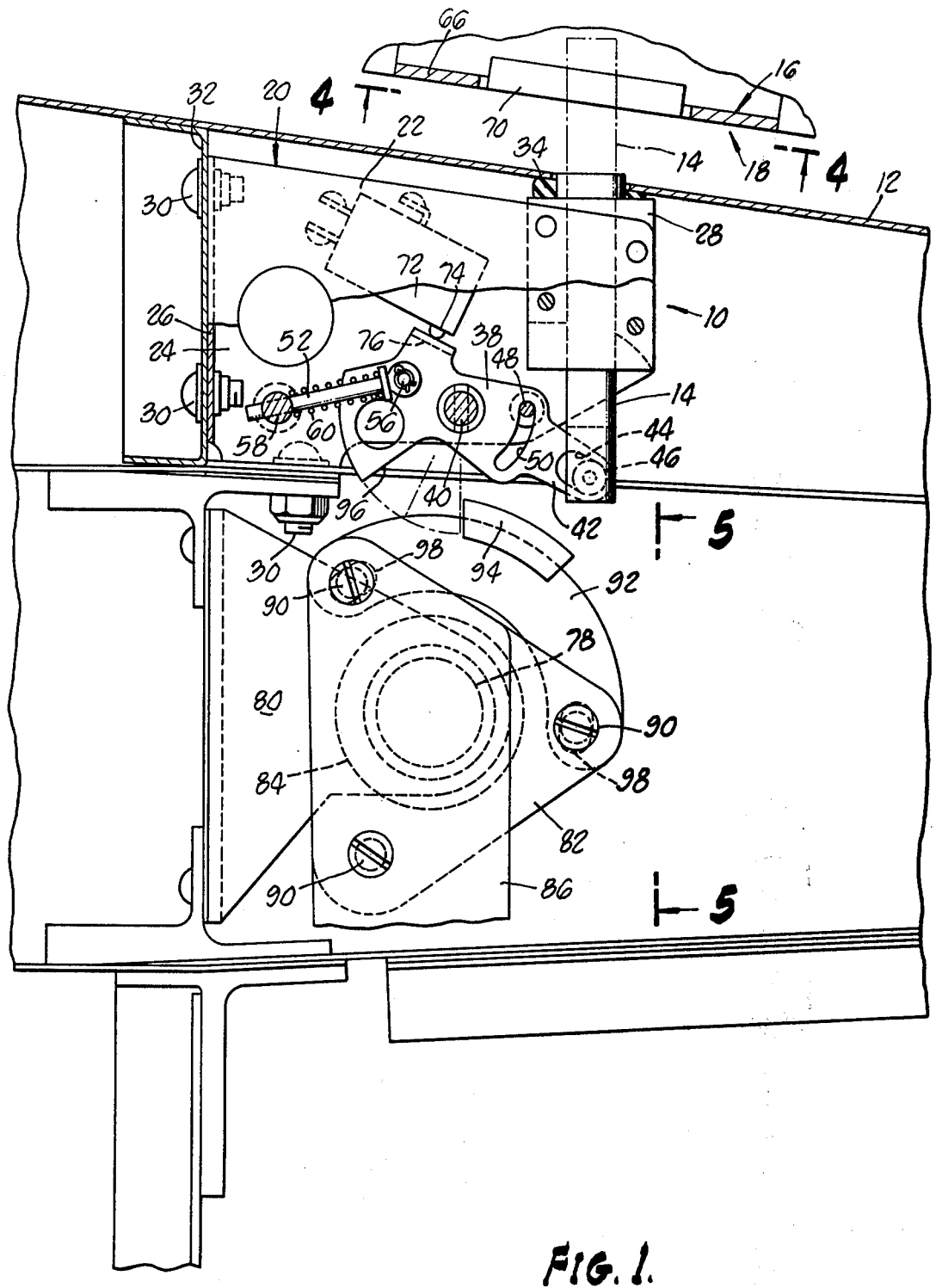
FIG. 1 is a fragmentary sectional view through the tail section of an airplane fuselage, showing the arrangement of the unitary locking mechanism of the present invention and its association with the airplane rudder and fail-safe connection with an elevator control mechanism.

Referring more specifically to the drawings, for illustrative purposes, the present invention is shown as being embodied in a locking unit 10 which is mounted within a section of the fuselage of the airplane, in this case a tail section having an enclosing wall or skin 12 through which a bolt 14 is arranged to project to a locking position with respect to a strike 16 carried by an adjacent portion of a flight control surface, in this case a rudder 18.

The locking unit 10 more specifically comprises a unitary assembly in which the various components are mounted upon a supporting bracket 20 of generally U-shaped configuration with a pair of spaced apart side walls 22 and 24 which extend outwardly from a bridging base portion 26. The bolt 14 is embraced by a block member 28 for rectilinear movements between a retracted position and an extended locking position. The block member 28 is secured between the outer ends of the side walls 22 and 24. The mounting bracket is secured in its base portion by means of mounting bolts 30 to a frame member of the airplane structure as indicated at 32. The bracket is so positioned that the bolt in its retracted position will not project beyond the skin or wall cover 12, but in its projecting position will extend outwardly beyond such wall. Preferably, the block member 28, in the mounted position of the mounting bracket 20, will be sealed by means of an annular sealing ring or member 34.

Between the block member 28 and the base portion 26 of the mounting bracket, there is mounted for rotative movements a rocker arm 38, this arm being affixed to a shaft 40 which is rotatably supported in the side walls 22 and 24.

The rocker arm is fabricated from a generally flat plate material and is configured to provide an arm 42 on one side of the shaft 40 which is pivotally connected at its outermost end by means of a slot 44 and roller 46 in the slot, with an end of the bolt 14.

The opposite end of the rocker arm is connected with spring means for urging the rocker arm from a dead-center position towards one or the other of limit positions as established by a pin member 48 which is positioned in an arcuate slot 50 formed in this end of the movable pivoted rocker arm.

The other end of the rocker arm is shown as being associated with spring urging means which comprises a pair of spring retaining pins 52 and 54 mounted on opposite sides of the rocker arm 38, these pins having head portions which are connected on a common pivotal axis to the rocker arm as established by a transversely extending pivot member 56. The other ends of the pins 52 and 54 are respectively mounted for endwise guided movements in a rocker shaft 58 having its ends rotatably supported in the side walls 22 and 24 of the mounting bracket. Each of the spring retaining pins is surrounded by a compression spring 60, one end of the spring bearing against the head end portion of the retaining pin, while the other end of the spring bears against the rocker shaft 58. As thus arranged, it will be apparent that as the rocker arm 38 is rotated to move the bolt 14 between retracted and extended positions, the pivot member at the head ends of the pins 52 and 54 will pass through a dead-center position, and that the compression springs 60 will coact to resiliently urge the rocker arm towards one or the other of its limit positions.

In order to enable manual operation of the locking unit by a ground attendant, the shaft 40 is extended laterally so as to position its outermost end in the wall or skin 12 of the fuselage structure, as shown in FIG. 2. The outermost end of the shaft 40 is supported within a mounting grommet 62, and the end portion of the shaft is endwise recessed, as indicated at 64, to releasably receive an appropriate actuating tool T by means of which the shaft 40 may be rotated in opposite directions, as desired, to effect locking and non-locking operations of the locking unit.

The strike 16 may be designed to have varied configurations. As shown, however, the strike is illustrated as comprising a generally plate-like member 66 which is centrally formed with an elongate opening 68 for receiving the outermost end of the bolt 14, when the bolt is extended to its projected locking position. If desired, this opening may be effected by the similarly bending up of side flanges 70 at the opposite sides of the opening.

From the foregoing description it will be apparent that the locking unit of the present invention, as installed on the airplane, is readily operable by a ground attendant to locking and unlocking positions with respect to the flight control surface element, in this case the rudder.

A feature of the locking unit of the present invention resides in the provision of switch means 72 for controlling an indicating device in the airplane cockpit to show the position of the bolt 14. In the present instance, this switch is provided with normally closed contacts which are arranged to be retained in an open position, when the bolt is in nonlocking operative position. Switch operation is accomplished by means of an actuating element 74 which is positioned for engagement by an abutment flange 76 formed on the rocker arm 38, when the rocker arm is moved to an operative position in which the bolt 14 will be moved to a non-locking position.

An important feature of the present invention comprises a fail-safe operating connection for moving the lock bolt from a locking position to a non-locking position in response to an operative movement of another swingably mounted flight control surface of the airplane. In the case of a locking mechanism for the rudder, advantage is taken of the adjacent operating mechanism for the plane elevators. As shown in FIGS. 1 and 5, the elevator control includes a control shaft 78 that is rotatably supported in a bracket structure 80 mounted upon internal framing.

As best shown in FIG. 5, the shaft 78, which is rotatable by control from the plane cockpit, carries a triangular plate member 82 formed with a central hub 84 by which it is secured by keying or otherwise to the shaft 78. The plate 82 provides a mounting connection for an elevator actuator arm 86 which is shown as being connected at its innermost end as by retaining bolts 90 to the plate member 82.

The plate member 82 also serves as a support for an arcuate cam member 92 which is formed with a peripheral projection 94. The rotative path of movement of the projection 94 is such that it will engage an abutment edge 96 of the rocker arm 38, when the rocker arm is in a position corresponding to the locking position of the bolt 14. As thus arranged, movement of the elevator actuating means during pre-flight testing or during take-off, will automatically move the bolt 14 to a non-locking position, thus affording a fail-safe condition permitting normal use of the rudder.

As shown in FIG. 1, the ends of the arcuate cam member 92 are secured as by a pair of retaining bolts 90 to the plate 92, and these ends are each provided with an elongate slot 98 which enables proper cam adjustment coincident with the locking position of the bolt 14.

With the fail-safe structure as described above, the plane operator will be assured of release of the rudder, in the event that it should be inadvertently left in a locked position by the ground attendant.

From the foregoing description and drawings, it will be clearly evident that the delineated objects and features of the invention will be accomplished.

Various modifications may suggest themselves to those skilled in the art without departing from the spirit of our invention, and, hence, we do not wish to be restricted to the specific forms shown and uses mentioned, except to the extent indicated in the appended claims.

We claim:

1. A locking mechanism for releasably fixing an airplane swingably mounted flight control surface means in a predetermined position, comprising:
    (a) a lock bolt mounted in a body portion of the airplane adjacent the swinging path of movement of a portion of said flight control surface means, said lock bolt being supported for movements between a locking operative position in which an end thereof projects into the path of movement of said portion of the flight control surface means, and a non-locking operative position out of the path of movement of said portion of the flight control surface means;
    (b) means for manually selectively actuating said bolt to said non-locking and locking (projected) positions including a member mounted adjacent an exterior surface of the fuselage near said flight control surface means and being accessible from the exterior of the airplane; and
    (c) a keeper carried by said portion of the flight control surface means, adapted to receive the projecting end of the bolt in said locking position.

2. A locking mechanism according to claim 1, in which associated fail-safe means includes an operating connection for moving said lock bolt from said locking position to said non-locking position, in response to an operative movement of a pilot operated control means for another flight control surface of the airplane.

3. A locking mechanism according to claim 2, in which said connection comprises rotatable camming means.

4. A locking mechanism according to claim 3, in which the actuating means includes a member supported for movement through a dead-center position to selectively place the bolt in said non-locking and locking positions; means resiliently urging said member away from said dead-center position; and said camming means including a projection engageable with said member and being operative to move said member from said bolt locking position through said dead-center position to said bolt non-locking position.

5. A locking mechanism according to claim 1, in which a mounting bracket carries said bolt and actuating means as a unit adapted for mounting on an internal frame structure of the airplane in a position such that the bolt in said locking position will extend outwardly of an enclosing wall structure for engagement with said keeper.

6. A locking mechanism according to claim 5, in which said member is rotatable and extends to the exterior of said enclosing wall structure.

7. A locking mechanism according to claim 6, in which said rotatable member comprises a shaft; and in which the outer end of said shaft is conformed to removably receive a tool for manually rotating said shaft in opposite directions.

8. A locking mechanism according to claim 5, in which said bracket is substantially U-shaped with spaced side walls extending from a bridging base portion; means supported between the outer ends of said side walls slidably embracing said bolt for reciprocal movements; said actuating means including a rocker arm positioned between said bolt and the base portion of said bracket, and in which said member comprises a shaft having the rocker arm affixed thereto, said shaft being rotatably supported in said bracket side walls; and said rocker arm having a pivoted connection at one end with the inner end of said bolt.

9. A locking mechanism according to claim 8, in which said shaft is conformed at one end to releasably receive an actuating tool.

10. A locking mechanism according to claim 8, including means for limiting said rocker arm movements between limit positions respectively positioned on opposite sides of a dead-center position; and means for resiliently urging said rocker arm towards one of said limit positions upon movement past said dead-center position.

11. A locking mechanism according to claim 10, in which the limiting means comprises pin and slot means.

12. A locking mechanism according to claim 10, in which the resiliently urging means includes a spring having one end connected to said bracket and another end connected to said rocker arm.

13. A locking mechanism according to claim 10, in which the resiliently urging means comprises spring retaining pins positioned on opposite sides of said rocker arm, said pins having head ends connected on a common pivotal axis to a second end of said rocker arm, and the opposite ends of said pins being respectively slidingly mounted for endwise movements in a rocker shaft extending between the side walls of said bracket; and compression springs respectively surrounding said pins and extending between the associated pin head end and the rocker shaft.

14. A locking mechanism according to claim 1, which includes electric circuit control means operable in response to the movement of said bolt to one of said positions.

15. A locking mechanism according to claim 14, in which said circuit control means comprises a switch having an actuating element engageable by a part of said manual actuating means,.

16. A locking mechanism according to claim 15, in which said part comprises a rocker arm having a pivotal connection with said bolt.

* * * * *